Aug. 26, 1924.

O. JORDAN 1,506,644

EMERGENCY STOPPING DEVICE

Filed Jan. 6, 1923

O. Jordan
INVENTOR

BY Victor J. Evans
ATTORNEY

WITNESS J. V. Earls

Patented Aug. 26, 1924.

1,506,644

UNITED STATES PATENT OFFICE.

OREM JORDAN, OF FREEDOM, PENNSYLVANIA.

EMERGENCY STOPPING DEVICE.

Application filed January 6, 1923. Serial No. 611,114.

*To all whom it may concern:*

Be it known that I, OREM JORDAN, a citizen of the United States, residing at Freedom, in the county of Beaver and State of Pennsylvania, have invented new and useful Improvements in Emergency Stopping Devices, of which the following is a specification.

This invention relates to braking means, and more particularly to what I term an emergency stopping device.

One of the main objects of the invention is to provide a device of simple construction and operation which may be readily applied to automobiles and by means of which blocks or similar elements may be readily inserted beneath the rear wheels of the automobile and between the same and the traction surface so as to quickly and positively stop the automobile, when required. A further object is to provide a device of this character which may be applied at comparatively small cost and which is of simple construction and operation. Further objects will appear from the detailed description.

In the drawings:—

Figure 1:
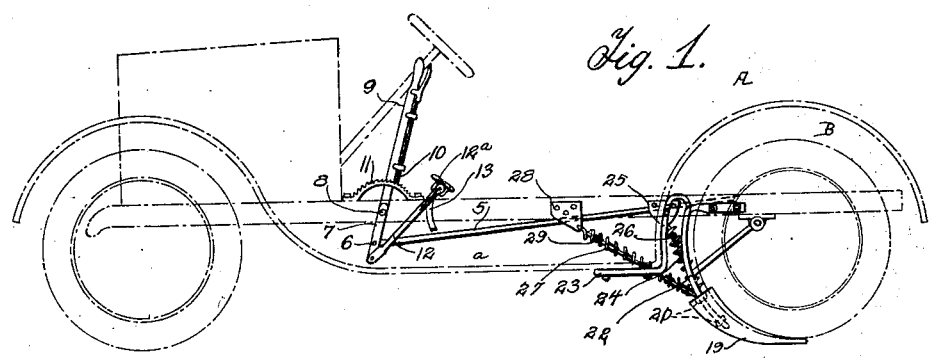
Figure 1 is a side view of the apparatus as applied.
Figure 2:
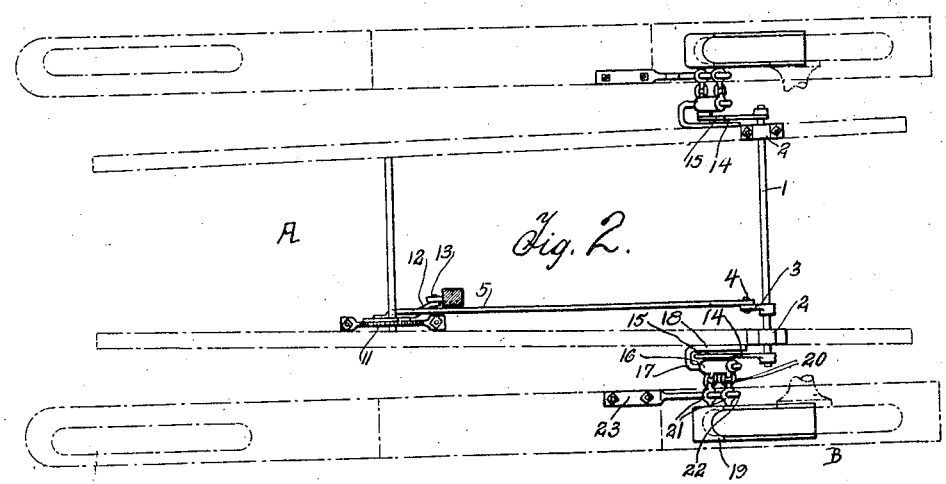
Figure 2 is a top plan view.
Figure 3:
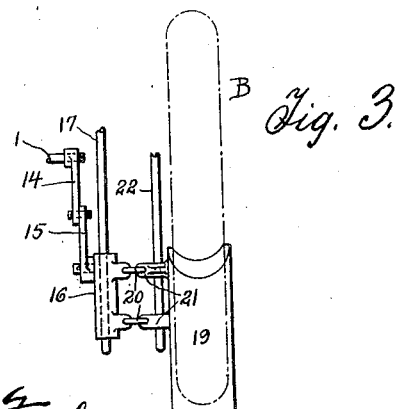
Figure 3 is a fragmentary front view showing one of the blocks and associated parts.

In applying the device I provide a shaft 1 which is rockably mounted transversely of the automobile body A in hangers 2 depending from the body. An arm 3 is secured to shaft 1 and has its outer end pivoted at 4 to a rod 5 which is pivoted at its forward end, at 6, to an arm 7 secured to a brake shaft 8 on which is secured brake lever 9 provided with a spring pressed detent 10 engaging a rack 11 disposed concentric with shaft 8. Arm 7 extends below rod 5 and is connected, at its lower end, by a link 12 to clutch pedal lever 13. By this construction when the emergency brake lever is operated the clutch pedal is depressed and throws the clutch out and shaft 1 is rocked.

Arms 14 are secured to shaft 1 adjacent to each side of the automobile and project forwardly from the shaft. The forward end of arm 14 is connected by a link 15 to a sleeve 16 which is slidable on a guide rod 17 disposed concentric with the adjacent rear wheel B of the automobile, this rod being secured at its upper end by means of an arm 18 to the automobile body. A brake member or block 19 is loosely connected by links 20, or in any other suitable or preferred manner, to sleeve 16 so that by moving this sleeve the brake block is moved about wheel B. The brake block is further provided, on its inner face, with eyes 21 which receive a guide bar 22 disposed concentric with wheel B and secured by an arm 23 to the underface of running board *a* of the automobile. A tension spring 24 is secured to the upper end of block 19, at its lower end, and has its upper end secured to a bracket 25 secured to chassis C of the automobile. A chain 26 is positioned within spring 24 and connects the bracket and the block, this chain being of such length as to permit tensioning of the spring sufficiently to permit the block to be positioned beneath wheel B while positively preventing downward movement of the block to such an extent as to permit the guide elements or eyes 21 to pass off of guide bar 22. A similar spring 27 connects the upper end of block 19 to a bracket 28 secured to the chassis in advance of bracket 25, and a chain 29 is positioned within spring 27 and secured to bracket 28 and block 19. The springs act to normally hold the block in raised position and to prevent looseness or play of the block while permitting movement of the block into operative position. The block tapers toward its lower end and is curved to fit beneath wheel B when in lowered position. When it is desired to stop the automobile quickly the emergency brake lever is pulled rearwardly into its extreme rearward position, and acts to throw the clutch out. This rocks shaft 1 to such an extent and in such direction as to lower blocks 19 into position beneath wheels B. As soon as the ends of the blocks pass beneath the wheels the wheels travel onto the blocks which are pulled downwardly against the action of springs 24 and 27 as far as the chains will permit, thus chocking the wheels and exerting a braking effect which serves to stop the automobile very quickly. When it is desired to start the automobile, after it has been stopped, this may be done by reversing the drive so as to back off of the blocks which are returned to inoperative or raised position, by the springs, when released from the wheels, by returning the emergency brake lever to normal or inoperative position thus releasing the clutch pedal lever, and throwing the clutch in.

It will be seen that I have provided simple and efficient means which act positively to brake and quickly stop a car, which means may be readily applied to an automobile of standard construction. The upper end of link 12 is connected, by pin and slot connections 12ª, to brake clutch lever 13. This permits freedom of movement of clutch lever 13 when the lever 9 is in inoperative position, and insures that the clutch will be thrown out when the brake lever is moved into operative position.

What I claim is:—

1. In braking means, a rockably mounted shaft, arms secured on said shaft, arcuate guide members, blocks slidable on said members into raised and lowered position, connections between said arms and the blocks for moving the blocks in accordance with rocking of the shaft, and means limiting downward movement of the blocks and for normally holding the blocks in raised position.

2. In braking means, a rockably mounted shaft, arms secured on said shaft, arcuate guide rods, guide bars spaced from and curved similarly to the rods, sleeves slidable on the rods, blocks provided with guide elements slidable on the bars, connections between the sleeves and said elements, connections between the sleeves and the arms for raising and lowering the sleeves in accordance with rocking of the shaft, and means for rocking said shaft.

3. In braking means, a rockably mounted shaft, arms secured on the shaft adjacent to the ends thereof, arcuate guide members, blocks slidably mounted on said members, connections between said arms and the blocks for raising and lowering said blocks in accordance with rocking of the shaft, a brake lever, a clutch pedal, and connections between the lever and pedal and the shaft for rocking said shaft in block lowering direction and moving the pedal into inoperative position when the lever is moved into operative position and moving the shaft in block raising direction when the lever is moved into inoperative position, said connections permitting raising and lowering of the clutch pedal when the lever is in inoperative position.

In testimony whereof I affix my signature.

OREM JORDAN.